United States Patent [19]
Carson

[11] 3,844,047
[45] Oct. 29, 1974

[54] ELECTRONIC MICROMETERS EMPLOYING DIGITAL PROCESSING TECHNIQUES

[76] Inventor: Robert W. Carson, 6871 Gano Dr., Little Falls, N.J. 30274

[22] Filed: Jan. 29, 1973

[21] Appl. No.: 327,558

[52] U.S. Cl. .............. 33/166, 33/147 N, 33/172 E
[51] Int. Cl. .......................................... G01b 7/02
[58] Field of Search .. 33/166, 164 R, 172 E, 174 L, 33/143 L, 147 N; 318/603, 685, 696

[56] References Cited
UNITED STATES PATENTS
| | | | |
|---|---|---|---|
| 3,190,009 | 6/1965 | Zagar | 33/166 |
| 3,465,217 | 9/1969 | Kress | 318/603 |
| 3,481,042 | 12/1969 | Lemelson | 33/174 L |
| 3,641,415 | 2/1972 | Weinz | 318/696 |

Primary Examiner—Louis R. Prince
Assistant Examiner—Richard R. Stearns
Attorney, Agent, or Firm—Arthur L. Plevy

[57] ABSTRACT

There is disclosed an electronic mircometer including a stepper motor drive, which stepper motor causes a shaft to rotate in a clockwise or counter-clockwise direction in a series of discrete steps. The stepper motor is coupled to a micrometer spindle so that each pulse applied to drive the motor is indicative of spindle movement. When the spindle contacts a work piece to be measured, the motor is de-energized and a counter stores a count therein indicative of the dimension of the work piece to be measured. The spindle is then automatically retracted an adjustable amount to enable clearance and insertion of the next work piece to be measured.

9 Claims, 5 Drawing Figures

PATENTED OCT 29 1974　　　　　　　　　　　　　　　3,844,047
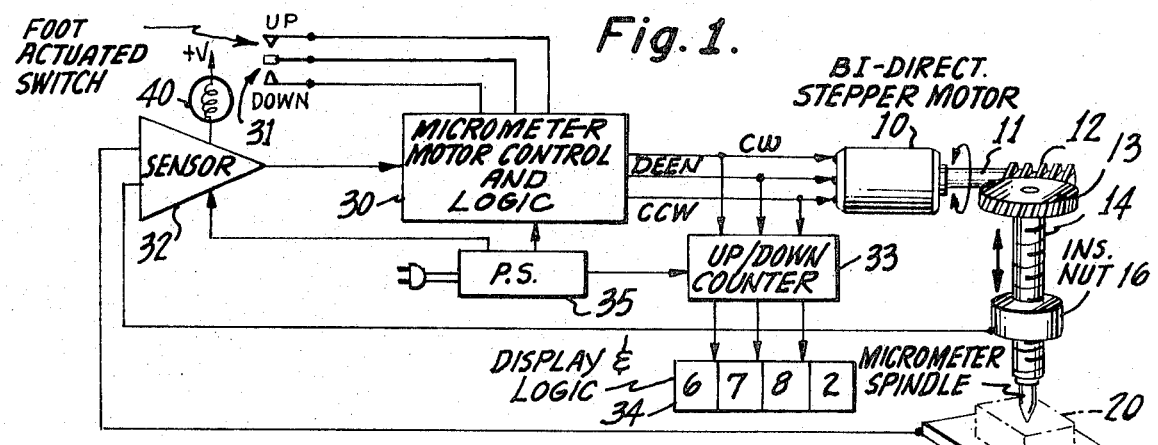
Fig. 1.
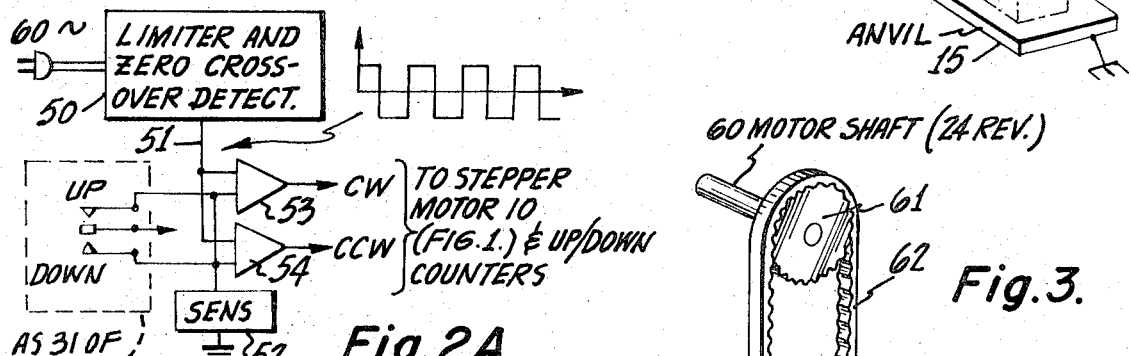
Fig. 2A.
Fig. 2B.
Fig. 3.
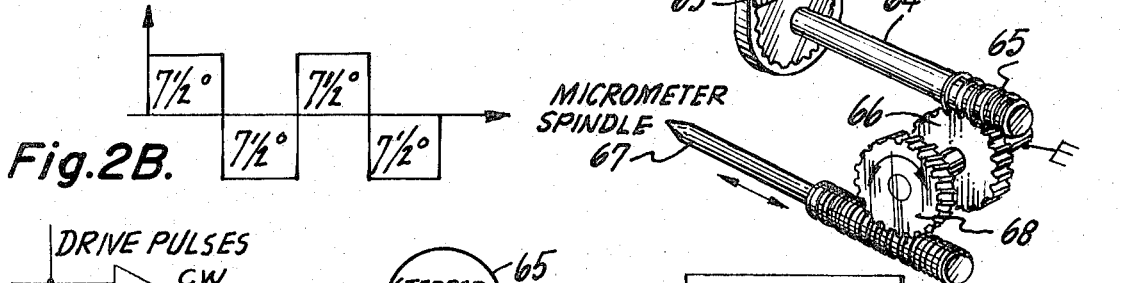
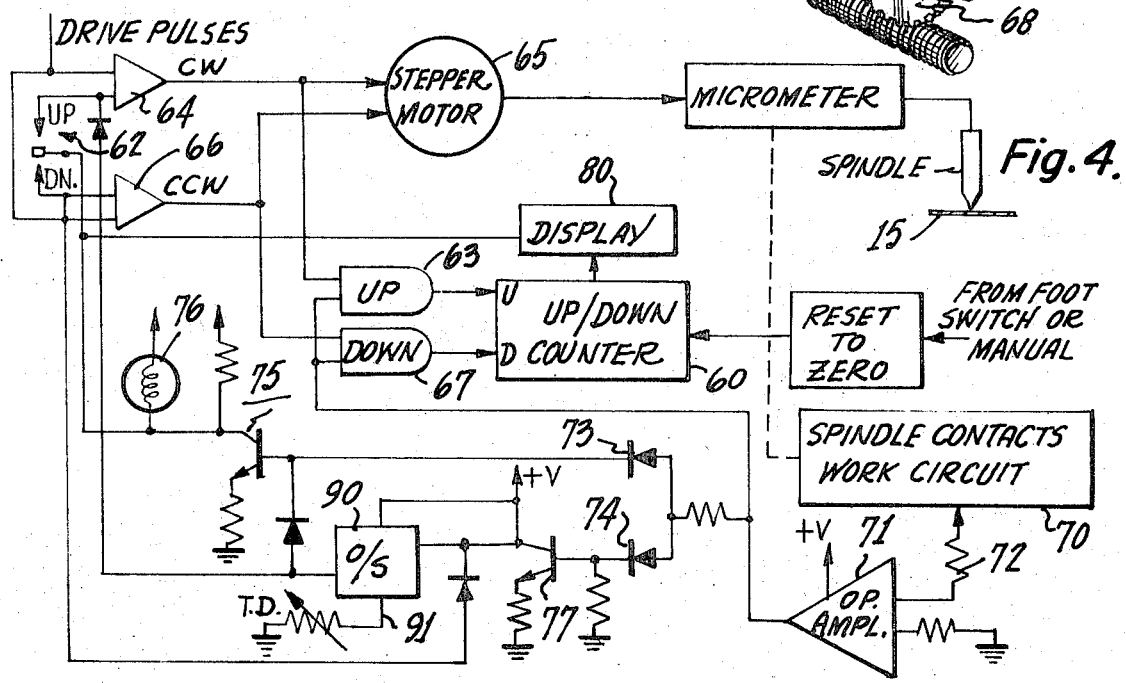
Fig. 4.

3,844,047

ELECTRONIC MICROMETERS EMPLOYING DIGITAL PROCESSING TECHNIQUES

BACKGROUND OF INVENTION

This invention relates to automatic measuring apparatus and more particularly to electronic micrometer systems for performing accurate measurements on various work pieces.

Basically, the electronic micrometer is well known in the art. Some of the earliest examples of such systems go back 20 years or more as is evidenced by U.S. Pat. Nos. 2,302,104; 2,290,940 and 2,139,997. The instruments available in the past eliminated many problems associated with the conventional hand operated micrometer. In general, these instruments are automatic in operation and provide direct reading on a mechanical counter of an appropriate dimension of the apparatus being measured.

In regard to such systems, there has been a relatively continuous development of a number of improvements to such micrometers although such improvements have not provided a micrometer which is capable of meeting the rigid standards of modern day technology. As is known, due to the rapidly expanding growth and technical achievements, there is a desire to produce as accurate an instrument as possible at a relatively inexpensive price. The two objectives in regard to many types of instruments are in direct conflict. Prior art micrometers employed many desirable features which are basic to the operation of such instruments. In order to gain further insight to the capabilities and objectives of such devices, it is felt that a brief discussion of such techniques is warranted.

A micrometer can accurately measure the dimensions of a work piece fabricated from either a conducting material or a nonconducting material.

For a conducting material, a micrometer spindle is rotated by means of a motor drive until it contacts the work. This creates a metal to metal contact which causes a current flow. An electronic sensing circuit detects this and stops the motor. The amount that the spindle moves in contacting the work is displayed on a mechanical read-out device in terms of thousands or less of an inch.

For non-conducting work, the same motor drive and electronic assembly is used except the micrometer spindle assembly is different. In this case, the tip on the micrometer engages the surfaces of the work and on contact is pushed upwards towards the micrometer spindle. When contact is made between the tip and the spindle, the motor is stopped and the read-out provides the dimensions of the work piece as being related to the distance that the micrometer tip was moved upward by the work to contact the micrometer spindle.

The advantages of such systems are apparent. The instruments eliminate manual effort in setting the micrometer spindle precisely and rapidly. Operation is relatively automatic and free from human error as the measuring process resulted in a direct reading of dimensions and was not affected by operator's interpretation in reading the graduations on the micrometer dial. For examples of such micrometers, reference is made to an article appearing in Product Engineering, McGraw-Hill, publication July 6, 1959 entitled "To One More Decimal Point."

Since the early instruments operated reliably, they remained virtually unaltered throughout the past two decades. As is the typical case with a reliable instrument, very few improvements or changes were made since the electronic micrometers of the prior art faithfully served their intended purposes. However, with the advent of increasing technology, it has become apparent that there is a need for an improved electronic micrometer exhibiting certain desirable features which were not available in such prior art devices as well as an instrument which would be simpler to construct, easier to use and in general more economical to fabricate.

BRIEF DESCRIPTION OF FIGURES

FIG. 1 is a block diagram of an electronic micrometer according to this invention;

FIGS. 2A and 2B are respectively a schematic diagram of a motor drive circuit for the micrometer system and a timing diagram of a drive pulse train;

FIG. 3 is a schematic diagram of a gear arrangement coupling a drive motor shaft to a micrometer spindle; and FIG. 4 is a detailed schematic diagram of an electronic micrometer apparatus according to the invention.

DESCRIPTION OF PREFERRED EMBODIMENT

An electronic micrometer of the type employing a spindle which is driven into contact with a work piece resting on an anvil to thusly locate said work piece between said spindle and anvil, said work piece having a desired dimension to be measured, the improvement therewith comprising apparatus for driving said spindle into contact with said work piece, comprising a bi-directional stepping motor including a shaft capable of rotating a full revolution in either a clockwise or counter-clockwise direction upon application of a suitable repetitive signal to either a first or second input associated with said motor together with gear means coupling said shaft to said micrometer spindle so that each repetition of said signal corresponds to a predetermined movement of said spindle, and means including a counter responsive to the number of repetitions of said signal as applied to said motor to store therein a number indicative of said repetitions, which number manifests the movement of said spindle and therefore the desired dimension of said work piece.

There are other features including an automatic back-off system which causes the spindle to retract from the work piece after the measure has been indicated by means of a suitable display.

DETAILED DESCRIPTION OF FIGURES

Referring to FIG. 1, there is shown a block diagram of an electronic micrometer system according to this invention.

Basically, the micrometer system employs bi-directional stepper motor 10. The motor 10 has a shaft 11 associated with it, which shaft can rotate, as will be further explained, in a clockwise (CW) or counter-clockwise (CCW) direction. The shaft 11 is coupled to a gear 12 which drives insulated gear 13. The gear 13 is rigidly secured to a micrometer screw 14 which can be moved up or down with respect to a fixed reference plane or anvil 15. The micrometer screw 14 is positioned within an insulated nut 16 which supports the micrometer screw. The function of the nut as well as the motion of the spindle is analogous to techniques employed in the prior art. The gear arrangement as shown in FIG. 1 is merely a schematic designation and does not purport to show correct motion, as it is known to use gears to drive a spindle in any desired direction.

Thus far, the mechanical drive assembly has been briefly described and it has been indicated that the basic assembly is similar to those found in the prior art. However, a major difference exists in that the main drive source is afforded by means of the bi-directional stepper motor 10. Many of the prior art systems used an induction motor and a clutch-brake drive assembly for control. This prior art technique created many problems. For example, these systems had inherent limitations (and still do) in measurement as well as difficulty in removing work pieces after measurement. In this manner, if the work moved and a slightly over-sized portion of the surface came into contact with the micrometer spindle undue resistance would occur causing damage to both the work piece and the instrument. To avoid this damage, the spindle was automatically withdrawn from contact with the work before attempting to remove the work.

With the induction motor of the prior art and associated brake assembly, there was always some overshoot in attempting to stop the micrometer once it contacted the work piece. Such overshoot was due to the inertia of the rotor which cannot be stopped instantaneously. Overshoot, of course, could be minimized by operating the induction motor or fabricating the gear assembly so that the system operated at very slow speeds. Due to slow speed operations, the amount of overtravel or overshoot was reduced so as to not substantially affect the final reading but this problem served to limit the operating speed to a rate that presented a serious problem in attempting to obtain highly accurate readings.

Briefly, a stepper motor is a device which is known in the art and in essence moves a fixed amount when energized by a given duration pulse. For example, a stepper motor might advance 1° in a distinct step each time it is energized. Thus, full rotation of shaft 11 would involve energizing the motor 360 times to cause it to move the shaft in 360 1° steps for a complete revolution. The above, of course, is only by way of an example and the number of degrees associated with each step could be more or less as will be explained.

In any event, with a stepper motor drive there will always be some overshoot, since the motor will complete any step that is started before it is de-energized but the step is exactly and accurately known, therefore, the overtravel is exactly and accurately known and is made significantly less than the amount of overtravel available with an induction motor and clutch-brake assembly operating at the same speed. Thus, the utilization of a stepper motor drive 10 in conjunction with an electronic micrometer affords one extreme advantage in virtually eliminating the overtravel problem inherent in the prior art. Other advantages in regard to the stepper motor drive are also available as will be described.

For the sake of simplicity, stepper motor 10 is shown coupled to a module 30 designated as micrometer motor control and logic. There are shown three leads emanating from motor 30 and coupled to stepper motor 10, respectively designated as CW, DEEN and CCW or clockwise, de-energized and counter-clockwise.

Shown coupled to module 30 is a switch mechanism 31 referenced as a foot activated switch and shown as single pole double throw (SPDT). Switch 31 can be activated in any one of three positions: (1) center contact is in contact with up arm of switch, (2) center contact is in contact with down arm of switch and (3) center contact is not in contact with either up or down arm switch. The foot activated switch is manually activated by the micrometer user or operator during the measurement process to be described. It is, of course, understood that the advantage of a foot operated switch is to enable the operator to have his hands free during the measurement process. It is, of course, understood that, if desired, any other type of switch could in fact be substituted for switch 31.

Shown coupled to the insulated nut 16 is a sensor circuit 32. The sensor circuit 32, as will be explained, detects when the micrometer spindle contacts the work 20 and serves to stop or de-energize the motor. In this manner, the output of the sensor 32 is shown coupled to an input of module 30. Also shown in the figure is an up-down counter 33 having inputs coupled to the output leads of module 30 and an output coupled to a display and logic module 34. As will be described, the up-down counter 33 is a digital counter comprising a plurality of multivibrators or flip flops arranged in a configuration to advance one count in a forward direction for each pulse applied to the CW input or to subtract one pulse from a fixed number for each pulse applied to the CCW input. Examples of up-down counters which can be operated accordingly are well known in the art and are available as integrated circuit modules. For examples of such suitable circuits and counter configurations, see a pamphlet entitled "Application Reports C.A. 102" by Texas Instruments (1968) pages 20–21; Chapter VII entitled "Synchronous Binary Counters And Shift Counters" (see also an article entitled "Bi-Directional Counting" by D. Fleming in E.D.N., Volume XII, Number 3, February 1967, pages 36–39; Part II, E.D.N., Volume XII, Number 4, pages 46–49).

Such a counter in combination with suitable gates and amplifier arrangements can typically drive a digital display 34, which display may comprise a series of read-out devices such as NIXIE tubes, LED display (light emitting diodes), liquid crystals or any other display normally associated with electronic read-out assemblies. The sole function of the display, as will be described, is to indicate the decimal or BCD or other equivalent of the number stored in the up-down counter 33, which number as also will be explained, is directly related to the dimension of the work piece 20 which is being measured.

The above components are biased by means of a power supply 35 which may be a battery supply or operates directly from the AC power lines.

BRIEF DESCRIPTION OF OPERATION

Referring again to FIG. 1, when the foot switch 31 is operated in the up position, the stepper motor 10 is activated and the motor drives the micrometer screw 14 away from contact with the work piece 20 via the gear assembly.

When the foot switch 31 is operated in the down position, the up direction circuitry is disabled and the stepper motor 10 drives the micrometer screw 14 down towards contact with the work 20. As soon as the micrometer spindle contacts the work 20, the sensor 32 detects this condition and power is withdrawn from the stepping motor 10 by means of module 30, thus stopping the motor. It is noted that the sensor circuit 32 also may include an indicator lamp 40 which will light when the work 20 is contacted, thus giving the operator a visual indication of contact.

The operator will then release the foot switch 31 to cause an adjustable backoff operation to occur.

As will be explained, the sensor circuit 32 contains an adjustable time delay circuit which senses the release of the foot switch and drives the spindle away from the work for a prescribed adjustable time, resulting in a displacement of the spindle from the work 20 to a desired location. This procedure is implemented by driving the stepper motor 10 after contact is sensed in the up direction. It is noted that dependent on the thread and gear configurations the up condition could be analogous with CW drive to the motor or vice versa. It is also noted that upon contact with work 20, the up-down counter 33 is stopped and its contents displayed by module 34, thus indicating the distance the micrometer traveled to contact the work 20, which as will be described, is the true dimension of the work 20 as measured.

The necessity of the adjustable back-off feature will now be described. When a micrometer is used, one would desire, for example, to measure a dimension of a work piece 20, as fabricated during an assembly line procedure. Thus, the micrometer may be used to measure a plurality of relatively identical work pieces.

As is known, various desired machine parts or work pieces are specified dimensionally within given tolerances which may be plus or minus thousandths of an inch or less. Therefore, it is possible that the next piece to be measured would be larger than the piece being measured and hence before one could insert the piece 20 between the anvil 15 and the spindle, one would have to retract the spindle. Furthermore, in order to remove the work piece 20 already measured without damage to the micrometer and/or the work piece 20, the spindle would have to be retracted.

The prior art left this to the discretion of the operator or caused the spindle to be driven away from the work piece an uncontrolled amount. Time was lost in the measurement process and operator discretion was paramount. In the system described, the back-off time and therefore distance can be optimumly pre-set assuring that all sizes of work pieces will be accommodated, thus eliminating the need for the operator to make any decision in regard to back-off and the savings of substantial time.

Certain of the desirable features of using a stepping motor were above described as compared to the conventional induction motor and clutch-brake assembly.

The above-described system also differs from the prior art in that there is the elimination of an encoder assembly entirely. Due to the basic principles of micrometer operation, one really desires to know how far the micrometer spindle traveled to contact the work, as this travel is indicative of the desired work dimension. Thus, the prior art devices monitored the rotation or revolutions of the micrometer screw 14. Since the pitch was known, the amount of distance was ascertainable and hence the dimension was inherent. Such encoders involved magnetic or optical pick-up devices which monitored shaft rotation or responded to the rate of shaft revolution.

In the above-described system, the counter 33 is directly coupled to the drive source of the motor and serves to count pulses to the motor 10, which pulses, as will be explained, are indicative of the micrometer movement.

Referring to FIG. 2A, there is shown a simplified circuit schematic of a drive assembly for a stepper motor as 10 of FIG. 1.

Numeral 50 references a module designated as a limiter and a zero cross over detector. An input to this circuit is derived directly from the main AC power lines which in the U.S.A. provide a 60 Hz frequency. The function of module 50 is to develop from the 115 volt 60 Hz sine wave a square wave having a 60 cycle rate and a desired magnitude, completely determined by the drive requirements inherent in the stepper motor characteristics. The output square wave appearing on line 51 is directed to two power gates or relay circuits 53 and 54. Another input to circuits 53 and 54 is derived from the foot actuated switch contacts (up and down) as switch 31 of FIG. 1.

Also shown coupled to an input of gate 54 is an adjustable time delay and sensor module 52 which includes the above-mentioned automatic back-off feature.

For purposes of explanation, it is assumed that stepper motor 10 of FIG. 1 will complete a 360° rotation or a full revolution for 24 pulses applied to the CW input. Accordingly, for 24 pulses applied to the CCW input the motor will cause shaft 11 (FIG. 1) to complete a full revolution in the reverse direction. If one divides 360° by 24, then each pulse provides a circular movement of shaft 11 of 15°. Referring to FIG. 2B, each half cycle is analogous to a 7½° movement or each complete cycle to a 15° movement. Thus, 24 cycles of the square wave shown provides a 360° shaft 11 rotation. Of course, since the shaft 11 is coupled to the micrometer screw and spindle via a gear train, the gear teeth ratios must be considered to determine distance traveled by the micrometer spindle. Thus if one can produce a one digit change in the micrometer screw position with one pulse applied to the stepping motor 10, then one would count by means of these pulses the movement of the micrometer screw and spindle and thus have a direct reading of distance on display 34.

Let us now assume that each revolution of the micrometer screw due to its pitch is 0.025 inches. Let us further assume that it is desired to read dimensions on display 34 to an accuracy of 0.0001 inches, which therefore requires a four digit display for module 34 of FIG. 1 and a four digit storage for counter 33.

The motor shaft 60 (FIG. 3) requires 24 pulses per revolution. The motor shaft 60 is coupled to a belt via a motor shaft gear or pulley 61 (see FIG. 3). The belt 62, which may be a timing belt, drives a second gear or toothed pulley 63 designated as a drive shaft gear. The gear 63 is coupled to a drive shaft 64. Now if the ratio of the pulleys are selected for a 36/15 belt drive reduction, the shaft 64 completes one revolution at the rate of 10 pulses to the stepper motor.

The drive shaft 64 is coupled to a worm gear 65. Gear 65 forms a worm gear drive with gear 66. The gear teeth ratio is selected at a 4/50 relationship, thus affording one revolution of gear 66 for 125 pulses applied to the stepping motor. Gear 66 drives a gear 68 via a shaft which gear 68 is coupled directly to the micrometer spindle gear 67. The ratio between 67 and 68 is selected at 28/56, thus causing the spindle to rotate once for 250 input pulses. Since one revolution of the spindle is 0.025 inches of travel, one pulse applied to the stepper motor is analogous to 1/250 of 0.025 inches or 0.0001 inch. Accordingly, each count stored by counter 65 as determinative of one pulse applied to the motor represents 0.0001 inch.

For a five digit display, the gear ratios necessary to read to 0.00001 inches are given in the following table:

TABLE FIVE DIGIT DISPLAY OR .00001 INCH

| RATIO (DRIVE) | PULSES PER REVOLUTION |
| --- | --- |
| Stepper Motor | 24 |
| Shaft, 25/24 Belt Drive | 25 |
| Gear 65 and Worm Gear Drive 66 - 1/50 | 1250 |
| Gear 68 to Spindle Gear 67 28/56 | 2500 |

In a similar manner, a 6 digit display or 0.000001 inch can be implemented with a 4/40 worm gear reduction between motor shaft 60 and pulley 61.

Thus, each pulse to the stepper motor is directly analogous to movement of the micrometer spindle and hence all counter 65 has to be responsive to is to these pulses, eliminating the need for an encoder and hence reducing the cost and complexity of the apparatus.

ELECTRONIC ASSEMBLY AND OPERATION OF UP/DOWN COUNTER MICROMETER CONTROL LOGIC AND AUTOMATIC BACK-OFF CIRCUIT (FIG. 4)

Referring to FIG. 4, the electronic system operates as follows. Before proceeding with a measurement, the operator causes the spindle to touch the anvil 15. The anvil or reference plane is a carefully planed and accurate surface. This therefore indicates the all zero position of the counter. The counter 60 is therefore reset to all zeroes at this, the calibrated position.

Reset techniques for counters 60 are well known and in fact the status of the anvil touching the spindle can be manually implemented by the operator to reset the counter to all zeroes.

Before a work piece is inserted on the anvil for measurement, the operator activates the foot switch in the up position to drive the spindle away from the anvil. This, of course, can be accomplished either by the up or down position or CW or CCW operation. For the sake of consistency, this direction has been described as the up position and will be indicative of CW operation as moving the spindle away from the anvil or work.

Thus as the operator depresses the switch 62 to the up position the counter is activated in the up count mode by AND gate 63 which can be a relay circuit or any other configuration. Gate 63 permits pulses to be applied to the counter as long as switch 62 is in the up position. As indicated, each pulse represents the spindle movement and hence the counter stores the exact distance the spindle moved away from the anvil. It is, of course, noted that amplifier 64 is also activated by the drive pulses as applied to the stepper motor 65 on the CW line. The operator, after moving the spindle a desired amount, releases the switch and stops the motor.

A work piece is now inserted between the spindle and anvil. Now the operator depresses the switch 62 to the down position, this causes the spindle to advance towards the work. The driver 66 is activated as is the down-count gate 67. Therefore, as the spindle is approaching the work, the initial count stored in the counter is being decreased for each pulse applied to the down gate 67 and hence to the up/down counter 60. When the spindle contacts the work, a switch or other prior art contact arrangement is closed. This technique for contact either on conductive or insulated work pieces is well known and is generally designated by module 70 referenced as SPINDLE CONTACTS WORK CIRCUIT.

Circuit 70, which may be a simple switch indicating contact provides a ground or voltage indication and is coupled to a high gain operational amplifier 71 via a large input resistor 72. The operational amplifier provides a voltage change at the output which change causes diode 73 to become forward biased turning on transistor amplifier circuit 75. This sequence causes the indicator lamp 76 to light indicating contact and causes the voltage on the center contact of switch 62 to be grounded, thus inactivating amplifiers 64 and 66, thus stopping the stepper motor, inactivating gates 63 and 67 (up and down gates) and causing the display 80 to indicate the reading stored which is the dimension of the work piece contacted.

For example, starting from the all zero count, assume the operator moved the spindle 25 units, so the counter 60 has 25 stored therein. Now assume that a work piece of 15 units were placed between the spindle and anvil. The spindle would therefore move down 10 units and contact will be made. Therefore, the counter decreased by 10 indicating the work dimension measured is 15 units. Of course, each unit as explained may represent 0.0001 or 0.000001 inches depending on the display length and gear arrangement used.

At the same time the work was contacted and the operational amplifier 71 changed state, the output of the amplifier 71 also forward biased diode 74 which turned on transistor amplifier 77. Transistor 77 is coupled to one input of a monostable multivibrator 90 or one-shot. The multivibrator 90 as is well known is of the type which provides a fixed duration pulse upon the occurence of a trigger pulse to the input. The monostable multivibrator is a well known circuit configuration and such a circuit can provide an adjustable length pulse duration by varying the magnitude of a timing resistor or potentiometer as 91.

At this time, as indicated, the display 80 is displaying the dimension of the work piece, the operator views this and may record it. If satisfied, the operator releases the foot switch. The release of the foot switch from the down position and the fact that the spindle contacts the work, triggers the one-shot 90. This output of the one-shot 90 activates the amplifier 64 to cause CW pulses to be applied to the motor 65. The one-shot also disables transistor 75 to place the entire logic unit back in the initial mode. Hence during the firing of the one-shot 90 the up gate 63 applies CW pulses to the up-down counter. At the end of the one-shot cycle the spindle is no longer contacting the work as it was backed off by the above procedure. The counter again was up-dated so that a new work piece of any given tolerance may now be inserted between the spindle and anvil and the procedure can start again.

For the above example of a work piece of 15 units assume permitted tolerance is ±4 units. In this case, the operator sets resistor 91 to cause a back-off of the spindle for 6 units, to assure complete clearance of oversized work pieces.

The resistor 91 can be calibrated in terms of distance, as was explained, one knows the number of input pulses required for a unit movement of the micrometer spindle. Therefore, at the end of the back-off cycle, the counter 60 indicates 15 plus 6 or 21. If the next work piece is 16 units, the operator upon depressing the foot switch in the down position would cause contact of work with the spindle at a 5 unit downward travel of the spindle and the counter and display would correctly indicate 16. The entire operation can then be repeated.

In summation, there is described a new and improved electronic micrometer apparatus which provides fast operation, free from operator judgment, digital display of distance and in general a system capable of very precise and accurate measurement by employing economical circuitry and unique system configurations.

While a fixed anvil or reference point was shown, it is of course obvious that a work piece or similar article could be transported by means of a belt assembly or other drive mechanisms and measured sequentially. In other applications a number of measurements might be made on a single work piece which is caused to vary position according to some desired program format.

What is claimed is:

1. Apparatus for performing accurate measurements of a dimension of a work piece or similar article positioned at a fixed reference point, comprising:
   a. a micrometer spindle rotatably positioned with respect to said reference point to move upon rotation towards or away from said point,
   b. a bidirectional stepper motor having an output shaft which can rotate by a discrete number of steps in either a clockwise or counter-clockwise direction upon application to said motor of a repetitive signal to either a first input for clockwise rotation or a second input for counter-clockwise rotation,
   c. gearing means coupling said output shaft of said motor to said spindle for moving said spindle away from said reference point in one of said clockwise or counter-clockwise rotations and towards said reference point for said other rotations,
   d. counting means coupled to said first and second inputs of said motor and responsive to the difference between repetitions applied to said first input as compared to repetitions applied to said second input to store therein a count indicative of the total number of effective repetitions applied to said motor to move said spindle towards said reference point, said stored count determinative of the total distance traveled by said spindle in the direction towards said reference point, and
   e. time delay means having an output coupled to said first or second input of said stepper motor and responsive to said spindle contacting said work piece to activate means for displaying said stored count for a desired time, after which said time delay means causes said motor to drive said spindle away from said reference point by a given distance according to a setting of said time delay means.

2. In an electronic micrometer of the type employing a spindle which is driven into contact with a work piece resting on an anvil to thusly locate said work piece between said spindle and anvil, said work piece having a desired dimension to be measured, the improvement therewith comprising apparatus for driving said spindle into contact with said work piece, comprising:
   a. a bi-directional stepping motor including a shaft capable of rotating a full revolution in either a clockwise or counter-clockwise direction upon application of a suitable repetitive signal to either a first or second input associated with said motor,
   b. gear means coupling said shaft to said micrometer spindle so that each repetition of said signal corresponds to a predetermined movement of said spindle,
   c. means including a counter responsive to the difference of the number of repetitions of said signal as applied between said first and second input of said motor to store therein a number indicative of the movement of said spindle and therefore the dimension of said work-piece,
   d. a switchable adjustable time delay having an input responsive to a control signal for activating an output after a predetermined adjustable time delay, said output coupled to either said first or second inputs associated with said motor to drive said spindle away from said workpiece by a predetermined adjustable distance, and
   e. means coupled to said input of said time delay for applying said control signal thereto in response to said spindle contacting said work piece to thereby cause said motor to drive said spindle away from said workpiece by said predetermined distance.

3. In apparatus for measuring a dimension of a work piece which work piece is positioned on a reference plane and thusly located above a movable micrometer spindle, which spindle moves an accurate, ascertainable distance for a complete revolution, said spindle rotatably mounted to move in a first direction towards said work piece and in a second direction away from said workpiece, the improvement therewith comprising apparatus for moving said spindle in either direction and providing an indication of the distance moved to contact said workpiece as positioned, which distance manifests the desired dimension of said work piece, comprising:
   a. a bi-directional stepper motor having a first input adapted to receive a series of pulses for rotating a shaft coupled to said motor a fixed number of degrees clockwise for each pulse applied to said first input, and a second input for rotating said fixed number of degrees counter-clockwise for each pulse applied to said second input,
   b. gear means coupling said motor shaft to said spindle to cause said spindle to move said ascertainable distance towards said work piece in said first direction for either said clockwise or counter-clockwise rotation of said motor shaft and to move said distance away from said work piece in said second direction for said other rotation of said motor shaft,
   c. means including an up/down counter coupled to said first and second inputs of said stepper motor, said counter responsive to said pulses received by said inputs to store a count indicative of the difference between the number of pulses on said first and second inputs as applied to said motor to cause rotation in either direction, said stored count being displayed for a desired period after said spindle contacts said work and determinative of the dimension of said work piece, and d. an adjustable time delay circuit responsive to said spindle contacting said work piece, said time delay circuit coupled to one of said first or second inputs to cause said spindle to move a predetermined distance away from said work piece after a predetermined time period according to the setting of said adjustable time delay.

4. The apparatus according to claim 3 wherein said bi-directional stepper motor moves at least n°, where n = a positive integer greater than 1 for each pulse applied to one of said inputs, whereby a full rotation of 360° is accomplished in 360 divided by n steps.

5. The apparatus according to claim 3 further comprising:
   a. a sensor circuit having an input coupled to said micrometer spindle and responsive to said spindle contacting said work piece to provide at an output thereof a signal indicative of said contact, and
   b. display means responsive to said signal and coupled to said up/down counter to cause said stored count to be displayed.

6. The apparatus according to claim 3 wherein said series of pulses are derived from the AC power mains and have a repetition rate equal to said frequency of said AC power mains.

7. The apparatus according to claim 3 wherein each pulse applied to said motor in either direction causes said spindle to move said ascertainable distance in a range between 0.001 and 0.0000001 inches.

8. Apparatus for measuring a desired dimension of a work piece to a given accuracy, comprising:
   a. a fixed reference plane defining a work piece accommodating surface,
   b. a micrometer spindle rotatably mounted with respect to said reference plane to move in a first direction towards said plane and in a second direction away from said plane, said spindle as positioned adapted to contact said work piece as placed on said reference plane,
   c. a bi-directional stepper motor having a rotatable output shaft, said shaft capable of being rotated in a series of discrete steps either in a first clockwise direction or in a second counter-clockwise direction upon application of a series of pulses to either a first clockwise input or a second counter-clockwise input,
   d. gear means coupling said motor shaft to said micrometer spindle to cause said spindle to move in said first direction for said counter-clockwise rotation and in said second direction for said clockwise rotation of said motor shaft,
   e. control means coupled to said first and second inputs of said motor to selectively activate said first or second input with said series of pulses,
   f. reciprocal counter means coupled to said control means and responsive to said series of pulses as applied to either of said first and second inputs to store a count indicative of the total number of pulses effectively utilized to move said spindle towards said work piece,
   g. sensor means responsive to said spindle contacting said workpiece for de-energizing said motor and activating means for displaying the stored count of said counter means upon said contacting, and
   h. adjustable control means responsive to the displaying of said stored count to cause said spindle to move in said second direction away from said work piece for a desired adjustable distance.

9. The apparatus according to claim 8 wherein said bi-directional stepper motor completes either a full clockwise or counter-clockwise rotation in $n$ discrete steps, where $n$ is a positive integer greater than 10.

* * * * *

UNITED STATES PATENT OFFICE
CERTIFICATE OF CORRECTION

Patent No. 3,844,047　　　　　　　　　　Dated October 29, 1974

Inventor(s) Robert W. Carson

It is certified that error appears in the above-identified patent and that said Letters Patent are hereby corrected as shown below:

TITLE PAGE - First Column after (76) Inventor
The address incorrectly reads "Little Falls, N.J." and should read
---Riverdale, Georgia---.

Signed and sealed this 7th day of January 1975.

(SEAL)
Attest:

McCOY M. GIBSON JR.　　　　　　C. MARSHALL DANN
Attesting Officer　　　　　　　Commissioner of Patents